(12) United States Patent
Yoshida et al.

(10) Patent No.: US 7,950,930 B2
(45) Date of Patent: May 31, 2011

(54) ELECTRIC JUNCTION BOX

(75) Inventors: Masaoki Yoshida, Shizuoka (JP);
Takuya Nakayama, Shizuoka (JP); Koji Ueyama, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/153,262

(22) Filed: May 15, 2008

(65) Prior Publication Data
US 2008/0299800 A1    Dec. 4, 2008

(30) Foreign Application Priority Data

May 28, 2007 (JP) .................................. 2007-140328

(51) Int. Cl.
*H01R 12/00* (2006.01)
(52) U.S. Cl. ....................................... 439/76.2; 439/205
(58) Field of Classification Search ................. 439/76.2, 439/190, 205
See application file for complete search history.

(56) References Cited

U.S. PATENT DOCUMENTS

| | | | | |
|---|---|---|---|---|
| 5,516,301 A | * | 5/1996 | Kawakita | 439/206 |
| RE38,412 E | * | 2/2004 | Munter et al. | 34/248 |
| 6,796,809 B2 | * | 9/2004 | Kakuta et al. | 439/76.2 |
| 6,870,096 B2 | * | 3/2005 | Suzuki et al. | 174/50 |
| 7,172,437 B2 | * | 2/2007 | Maebashi | 439/76.2 |

FOREIGN PATENT DOCUMENTS

| | | |
|---|---|---|
| CN | 2301488 Y | 12/1998 |
| CN | 1303974 A | 7/2001 |
| JP | 2000-102138 | 4/2000 |
| JP | 2002-152943 | 5/2002 |
| JP | 2003-348732 | 12/2003 |
| JP | 2004-328842 | 11/2004 |

OTHER PUBLICATIONS

Office Action dated Mar. 8, 2010 issued in the corresponding Chinese Patent Application No. 200810109311.6

* cited by examiner

*Primary Examiner* — T C Patel
*Assistant Examiner* — Travis Chambers
(74) *Attorney, Agent, or Firm* — Edwards Angell Palmer & Dodge LLP

(57) ABSTRACT

It is object of the present invention to provide an electric junction box that can effectively drain liquid away therefrom. The electric junction box in accordance with one embodiment of the present invention comprises a wiring board; a connector block having a body, and a terminal passing through a bottom wall of the body and being electrically connected to the wiring board at an end portion thereof, the body having a groove formed on an inner face of the bottom wall, and an outlet communicating with an end of the groove; and a case being disposed above the bottom wall, having a hole disposed thereon, and being configured to receive both the wiring board and the connector block therein, the hole being configured to pass an opposite end portion of the terminal therethrough. In such a construction, when liquid leaks into the case via the hole and arrives at the bottom wall, the groove is configured to take the liquid up and to guide the liquid to the outlet due to capillary phenomenon.

4 Claims, 7 Drawing Sheets

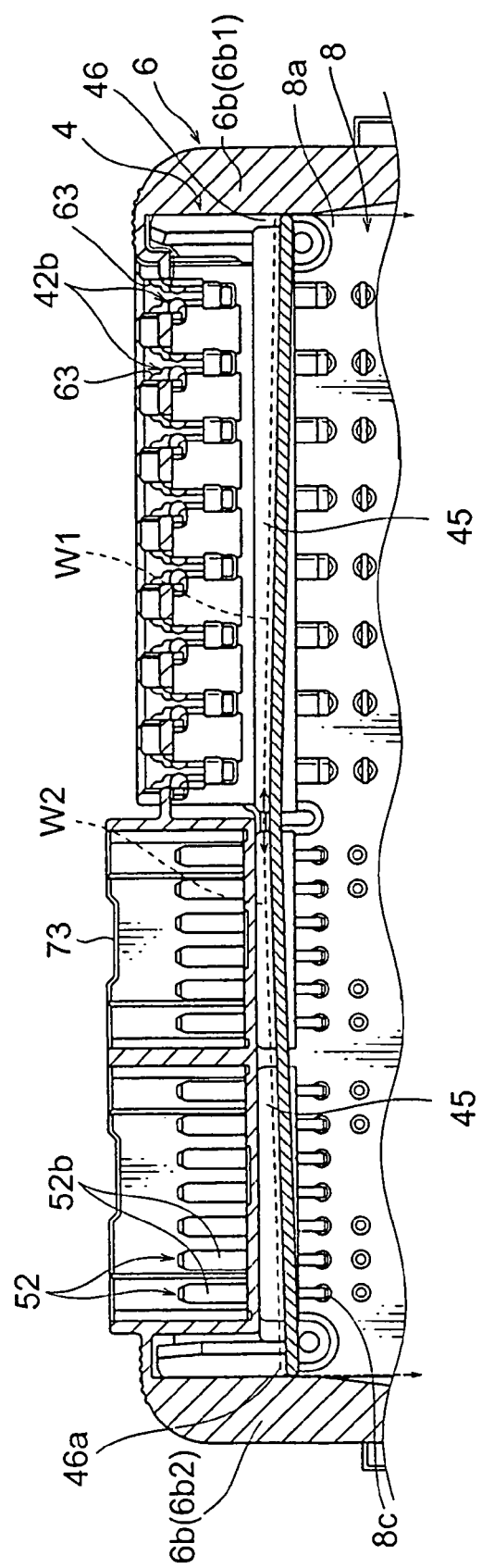

ELECTRIC JUNCTION BOX

CROSS-REFERENCE TO RELATED APPLICATIONS

The present application claims priority of Japanese Patent Application No. 2007-140328 filed on May 28, 2007, the disclosure of which is expressly incorporated by reference herein in its entirety.

This application is related to co-pending applications: "ELECTRICAL JUNCTION BOX" filed even date herewith in the name of Masaoki YOSHIDA et al., which claims priority under 35 U.S.C. §1.119 to Japanese Patent Application No. 2007-140327; and "ELECTRIC JUNCTION BOX" filed even date herewith in the name of Masaoki YOSHIDA et al., which claims priority under 35 U.S.C. §1.119 to Japanese Patent Application No. 2007-140329, and which applications are assigned to the assignee of the present application and are incorporated by reference herein.

BACKGROUND OF THE INVENTION

1. Field of the Invention

The present invention relates to an electric junction box having a drainage device and suitable for use in vehicle such as automotive vehicle.

2. Description of the Related Art

A vehicle such as automotive vehicle is generally equipped with a variety of electricity activated components, for example, a lamp such as a head lamp and a rear lamp, and a motor such as a starter motor and a motor for driving an air-conditioner. To provide these components with electricity, an electric junction block is distributed within automotive vehicle, as needed. The junction block is constituted by a plurality of electrical circuit units such as a fuse and a relay.

Further, as the junction block is generally contemplated to include a fuse, a relay, and a bus bar, the electric junction box is referred to a fuse block and a relay box. The junction block has been often called "electric junction box" in its broad concept. As used herein, the term "the electric junction box" should be contemplated to include all of the foregoing fuse block, relay box, and junction block.

Exemplary electric junction box is comprised of a wiring board having one or more electric components installed therein; a connector block having a body and a terminal passing through the bottom wall of the body and being electrically connected to the wiring board at its one end portion; a case being disposed above the bottom wall of the body, having a hole for passing the other end portion of the terminal therethrough and being configured to receive both the wiring board and the connector block therewithin.

An electric component such as a fuse can be coupled to the terminal passing through hole. As the fuse can be releasably coupled to the case, maintenance operation thereof can be easily performed. On the other hands, there is high possibility that water can leak into the case via the hole. Further, the water can adversely affect the wiring board received within the case and the electric components mounted on the wiring board. For example, due to the water, short-circuit failure as well as corrosion damage to the wiring board can occur, thereby causing the electric junction box not to function properly.

To solve the afore-mentioned problems, there has been proposed an electric junction box comprising a body having a groove formed on the inner surface of the bottom wall (i.e., bottom face), and an outlet communicating with one end of the groove. This electric junction box is, for example, disclosed in Japanese Publication of Un-examined Patent Application No. 2003-348732. The groove is formed along the longitudinal direction of the connector block and is also inclined downward toward the outlet. When water leaks into the case via the hole, the groove can efficiently take up water and guide it to the outlet, thus allowing the water to be drained away from the case.

Further, there have been proposed an electric junction box having a groove formed along the width direction of the connector block and inclined downward toward the outlet, as disclosed in two Japanese Publications of Un-examined Patent Applications No. 2004-328842 and No. 2000-102138, as well as, an electric junction box having a groove formed along both longitudinal and width direction of the connector block and inclined downward toward the outlet, as disclosed in Japanese Publication of Un-examined Patent Application No. 2002-152943.

Meanwhile, in the case of using the afore-mentioned electric junction boxes as disclosed in Japanese Publication of Un-examined Patent Applications No. 2003-348732 and No. 2002-152943, water that leaks into the case and arrives at the bottom face of the connector block is inclined to form a plurality of discrete droplets without flowing along the groove. In this case, the droplets remains at the bottom face of the connector block so as not to be well drained via the outlet. Furthermore, the water that still remains within the case can adversely affect the wiring board received within the case and the electric components mounted on the wiring board. For example, due to the water, short-circuit failure as well as corrosion damage to the wiring board can occur, thereby causing the electric junction box not to function properly.

Therefore, the object of the present invention can be attained by an electric junction box that is configured to effectively take up the remaining water therein and drain it therefrom.

SUMMARY OF THE INVENTION

To solve the afore-mentioned problem, there is provided an electric junction box, which comprises a wiring board; a connector block having a body, and a terminal passing through a bottom wall of the body and being electrically connected to the wiring board at an end portion thereof, the body having a groove formed on an inner face of the bottom wall, and an outlet communicating with an end of the groove; and a case being disposed above the bottom wall, having a hole disposed thereon, and being configured to receive both the wiring board and the connector block therein, the hole being configured to pass an opposite end portion of the terminal therethrough. In such a construction, when liquid leaks into the case via the hole and arrives at the bottom wall, the groove is configured to take the liquid up and to guide the liquid to the outlet due to capillary phenomenon.

In above electric junction box construction, the groove has a bottom face inclined downward toward the outlet.

Preferably, the body further includes a second outlet communicating with an opposite end of the groove, and the bottom face of the groove is formed to be inclined downward from a middle area of longitudinal length of the groove toward each of the outlets.

BRIEF DESCRIPTION OF THE DRAWINGS

FIG. 7 is a cross sectional view of a second embodiment of an electric junction box of the present invention.

DETAILED DESCRIPTION OF THE INVENTION

A first embodiment of the electric junction box 1 of the present invention will be hereinafter described with reference to FIGS. 1 to 6. For example, the first embodiment of the electric junction box 1 of the present invention can be received within the other electric junction box, and can be in turn mounted to an automotive vehicle. Due to this electric junction box 1, electric power or electricity provided by battery and the likes can be distributed to each of the electric device via a variety of electric components such as a fuse and a relay 11.

Figure 1:
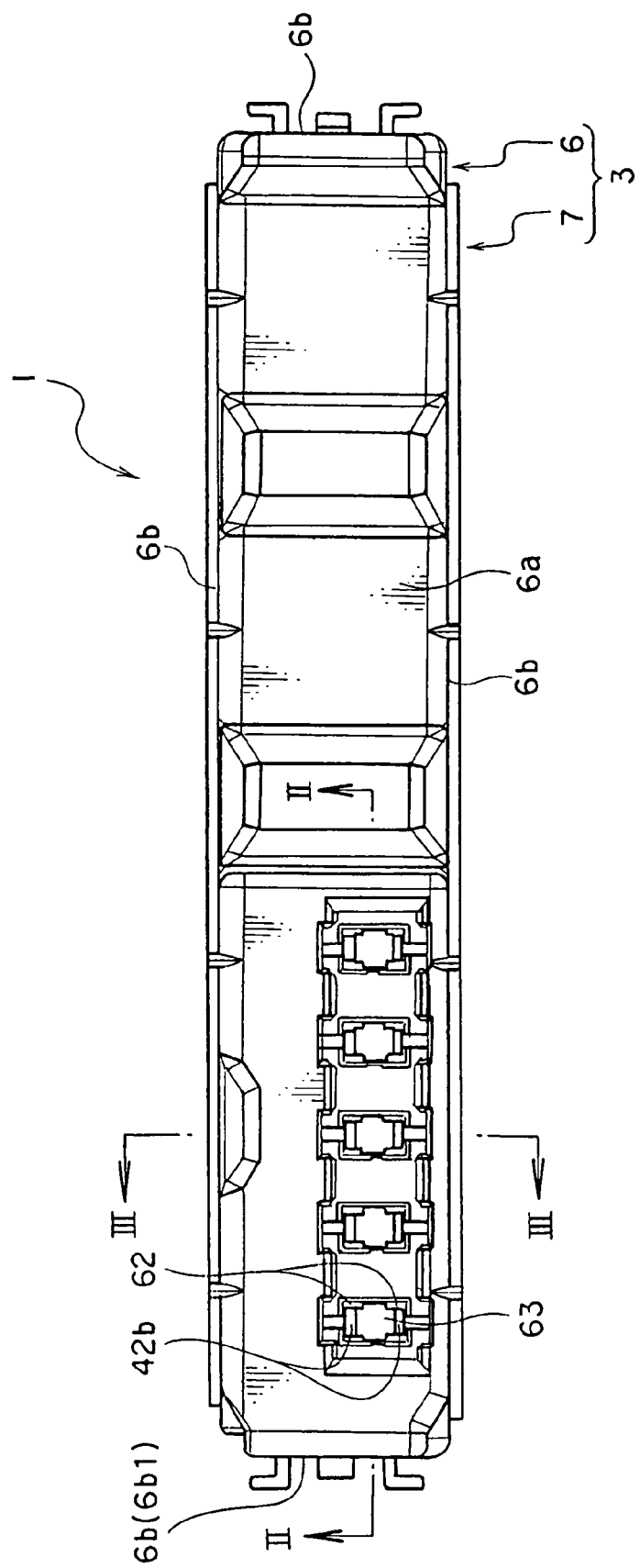
FIG. 1 is a top view showing a first embodiment of an electric junction box of the present invention.
Figure 4:
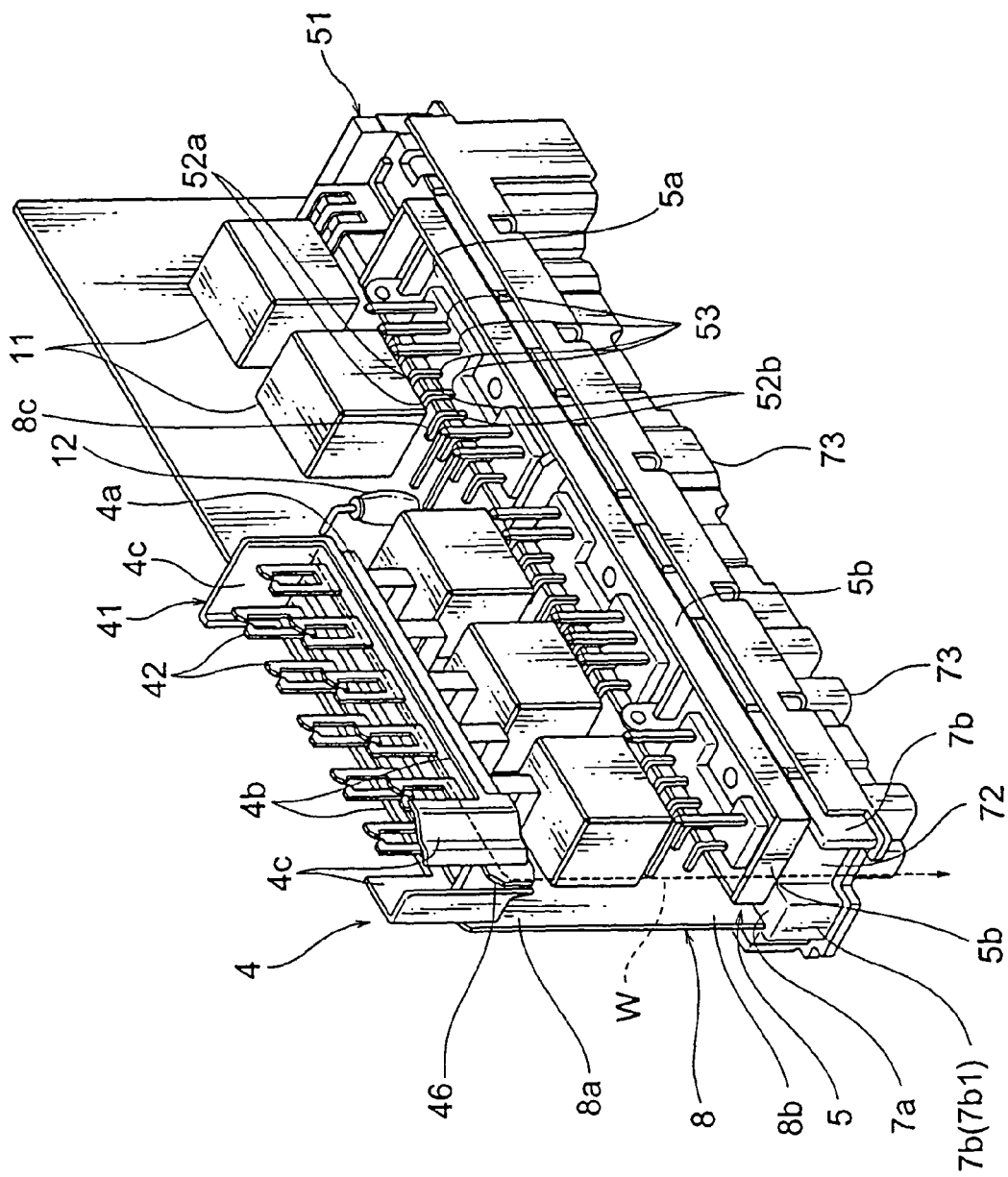
FIG. 4 is a perspective view of the electric junction box of FIG. 1 with its upper case omitted.

Referring now to FIGS. 1 and 4, the electric junction box 1 is shown to include a printed circuit board assembly 2 and a case for receiving the printed circuit board assembly 2 therein. As shown in FIG. 4, the printed circuit board assembly 2 includes a base 8 as a wiring board, a relay 11 and a resistance 12 mounted to the base 8, and connector blocks 4 and 5 engaged to the base 8.

The base 8 is formed having the form of an approximately rectangularly-shaped plane. The base 8 is shown to include a pair of printed wiring boards, and a conductor plate disposed between a pair of the printed wiring boards. These printed wiring boards and conductor plate overlap each other and are thus unitarily formed. Since one printed wiring board is substantially equivalent to the other printed wiring board in its construction, a representative printed wiring board will be hereinafter illustrated in great detail.

Figure 3:
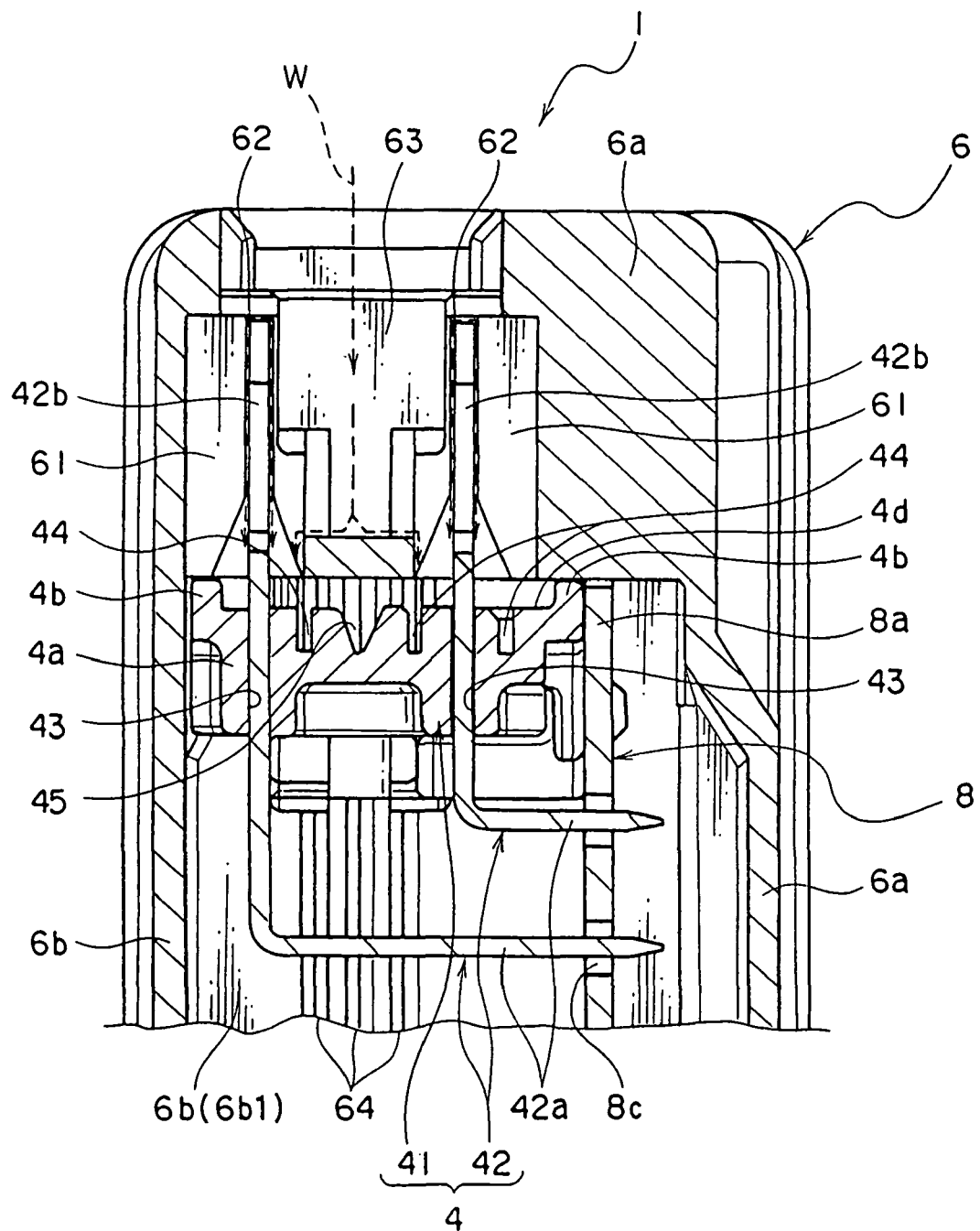
FIG. 3 is partially cross sectional view taken along line III-III of FIG. 1.

The printed wiring board comprises an insulating substrate, a conductor pattern formed on the surface of the substrate and at the same time forming a desired circuit, and a through-hole 8c passing through the substrate as shown in FIG. 3.

The base 8 is formed of insulating synthetic resin. The base 8 is made having the form of an approximately rectangularly-shaped plane. The conductor pattern is formed in the form of thin-layer made of electrically-conductive metal material such as copper. This conductor pattern is bound to the surface of the substrate. In accordance with this embodiment of the present invention, the conductor pattern has an approximately rectangularly-shaped cross section.

There is a plurality of the through-holes 8c that is generally formed having an approximately circular cross section. The through-hole 8c penetrates through the substrate and the conductor plate sandwitched between both the printed wiring boards, as well as, the substrate of the other printed wiring board. The terminal of the relay 11, a lead wire of the resistance 12, each substrate-connection members 42a and 52a of a fuse terminal 42 and a connection terminal 52 which will be hereinafter described in further detail are respectively inserted into the through-hole 8c. Copper is largely plated to the inner face of the through-hole 8c by means of metal plating technique. On the surface of the substrate surrounding the through-hole 8c, there is provided an annular land, which is electrically connected to the plated layer and is also connected to the terminal of the relay 11, the lead wire of the resistance 12, and the substrate-connection members 42a and 52a by means of soldering.

The conductor plate can be formed of electrically-conductive metal such as copper. The conductor plate is formed having the form of an approximately rectangularly-shaped plane. The overall planar shape of the conductor plate is approximately identical to that of the substrate of the aforementioned printed wiring board. The conductor plate is fragmented into a plurality of conductor plate subunit so as to form a desired circuit. Each of the conductor plates is electrically connected to the land of the printed wiring board (i.e., the conductor pattern) via the plated layer applied to the inner face of the through-hole 8c.

As shown in FIG. 4, the connector blocks 4 and 5 are respectively disposed on the upper end 8a and lower end 8b of the base 8, and are secured to the base 8. Furthermore, the connector block 4 corresponds to the connector block set forth in the appended claims.

As shown in FIG. 4, the connector block 4 is generally disposed within the area ranging between one end of the base 8 and approximate center portion thereof along the longitudinal length of the base 8. This connector block 4 is shown to include a block body 41 and a fuse terminal 42.

The block body 41 is, for example, formed of insulating synthetic resin. The block body 41 is shown to have a bottom wall 4a having an approximately rectangularly-shaped plane, a frame wall 4b extending vertically from the periphery of the bottom wall 4a, and a vertical wall 4c extending vertically from both longitudinal ends of the bottom wall 4a. The vertical wall 4c is made higher than the frame wall 4b based on the height of the bottom wall 4a.

Figure 6:
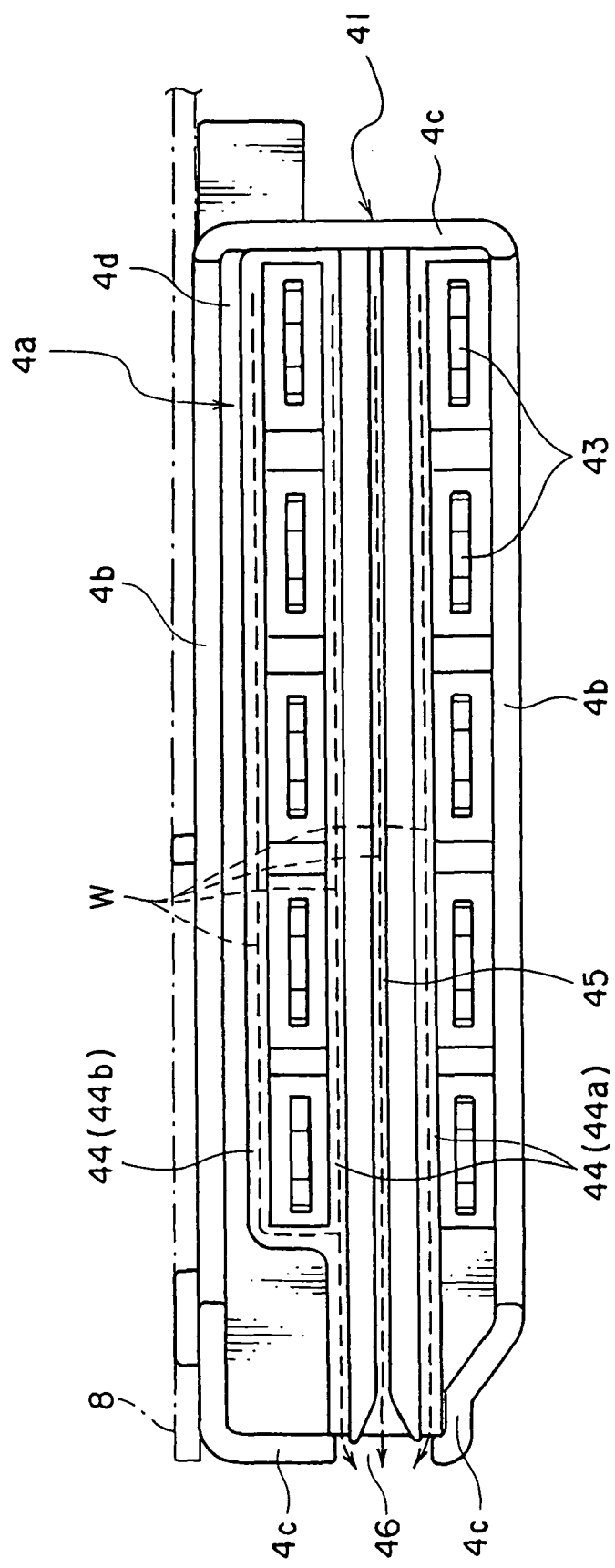
FIG. 6 is a top view showing the connector block of FIG. 4.

Further, as shown in FIG. 6, the block body 41 includes a terminal-receiving portion 43 extending through the bottom wall 4a, a groove 44 and V-shaped groove 45 both formed on the bottom face 4d corresponding to the inner face of the bottom wall 4a, and an outlet 46 communicating with respective one end of the groove 44 and V-shaped groove 45.

The terminal-receiving portion 43 has an approximately rectangularly-shaped cross section. The longitudinal direction of the terminal-receiving portion 43 is substantially in parallel with that of the bottom wall 4a. A plurality of the terminal-receiving portions 43 is arranged in total two rows in parallel with each other along the longitudinal direction of the bottom wall 4a When the fuse-connection member 42b of the fuse terminal 42 is press-fitted into the terminal-receiving portion 43, it is closely fitted to the terminal-receiving portion 43 for the prevention of liquid leakage.

Figure 2:
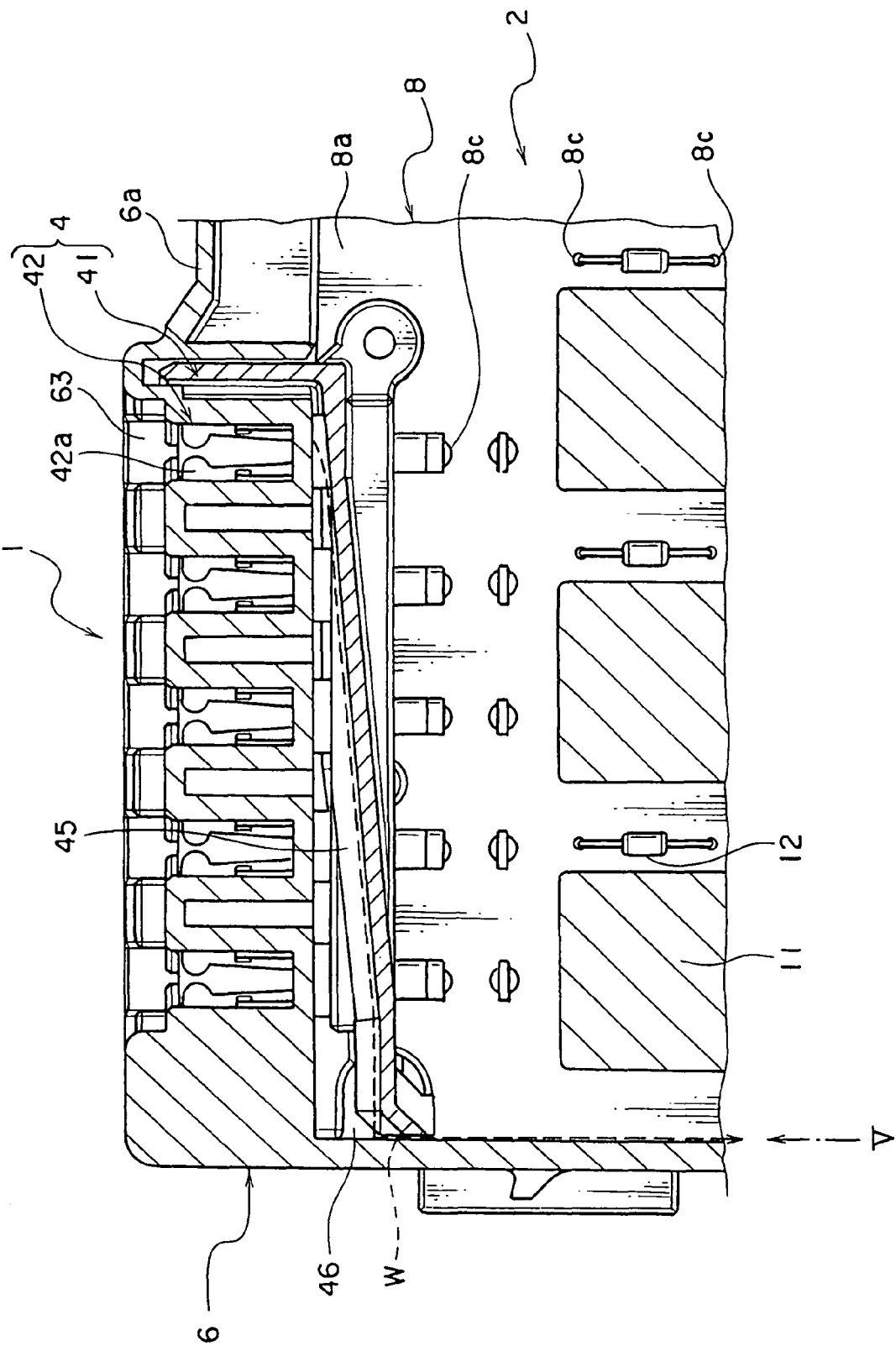
FIG. 2 is a partially cross sectional view taken along line II-II of FIG. 1.

The groove 44 is recessed from the bottom face 4d, and therefore has a concaved cross section. The groove 44 is disposed along the foregoing rows of the terminal-receiving portions 43, and at the same time has a length approximately equivalent to the full-length of the row of the terminal-receiving portion 43. The width of the groove 44 is uniformly formed. As shown in FIG. 2, the bottom face of the groove 44 is inclined downward toward the outlet 46. There are provided total three grooves comprising two grooves 44a disposed between two rows of the terminal-receiving portions 43 and one more groove 44b disposed between the row of the terminal-receiving portion 43 and one edge portion of the bottom wall 4a. These three grooves 44 are in parallel with each other. The groove 44b is disposed adjacent the base 8. One end portion of the groove 4b adjacent the outlet 46 is angled at about 90 degrees so as to merge into the groove 44a adjacent the base 8. (See left-hand side in FIG. 6)

The groove 44 is made to have a narrow width for the achievement of high efficiency of capillary phenomenon. When liquid leaks into the case 3 via the terminal hole 62 disposed on an upper case 6 and then arrives at the bottom face 4d, the liquid can be efficiently taken, guided to the outlet 46, and then drained away from the connector block 4, due to the afore-mentioned capillary phenomenon. The width of the groove 44 can be properly designed depending on a variety of external factors such as the distance, the width, and the depth of the desired drainage pathway, as needed. The electric junction box in accordance with this embodiment of the present invention whose groove is set to have a width of 0.5 mm is shown that efficient capillary phenomenon can be achieved.

V-shaped groove 45 is recessed from the bottom face 4d and has an approximately V-shaped cross section. The V-shaped groove 45 is defined between two grooves 44a and has a longitudinal length approximately equivalent to that of the groove 44. In this case, the width of the V-shaped groove 45 is uniformly formed. The bottom face of the V-shaped groove 45 is also inclined downward toward the outlet 46.

The outlet 46 is made to have a notch, which is defined by cutting off at least one portion of the vertical wall 4c adjacent the bottom wall 4a. Each downwardly inclined end of the bottom face of the groove 44 and the V-shaped groove 45 is disposed such that it can communicate with the outlet 46. Such a construction allows the liquid to flow down into the connector block 4 via the groove 44 and the V-shaped groove 45, and to be drained away from the connector block 4.

A plurality of the fuse terminal 42 is made bent, for example, by pressing a sheet metal. As shown in FIG. 3, the fuse terminal 42 is formed in "L" shape, and also includes a substrate-connection member 42a at its one end, and a fuse-connection member 42b being perpendicular to the substrate-connection member 42a and defining its opposite end. The substrate-connection member 42a is inserted into the through-hole 8c in a direction perpendicular to the base 8, passes through the through-hole 8c, and is electrically connected to the base 8 at its tip portion. The fuse-connection member 42b is press-fitted into the terminal-receiving portion 43 of the block body 41, passes through the bottom wall 4a, and is electrically connected to the fuse at its tip portion.

In the above-referenced connector block 4, the substrate-connection member 42a of the fuse terminal 42 is inserted into the through-hole 8c of the base 8, and is secured to the base 8, for example by means of screw, such that the bottom wall 4a is disposed perpendicular to the base 8 and at the same time is in parallel with the longitudinal direction of the base 8. Both groove 44 and V-shaped groove 45 are disposed in parallel with the longitudinal direction of the base 8. In this case, the bottom face of the groove 44 and the V-shaped groove 45 are downwardly inclined with respect to the horizontal direction. The fuse-connection member 42b is formed projecting from the upper end 8a of the base 8 and being perpendicular to the width of the base 8, and is inserted into a terminal hole 62 disposed on the upper case 6.

When liquid leaks into the case 3 and then arrives at the bottom face 4d of the connector block 4, it flows through the groove 44 and the V-shaped groove 45. Liquid that is difficult to be drained by the V-shaped groove 45 due to its high surface tension will be efficiently drained by the groove 44. As a result, the liquid is guided to the outlet 46 along the downwardly inclined bottom face of the groove 44 and the V-shaped groove 45, and is successfully drained away from the connector block 4.

On the other hands, as shown in FIG. 4, the other connector block 5 has a length approximately equivalent to the longitudinal length of the base 8. The connector block 5 is shown to include a connection terminal 52 and a block body 51.

The block body 51 is formed of insulating synthetic resin. The block 51 is shown to have a bottom wall 5a having the form of an approximately rectangularly-shaped plane, a frame wall 5b extending vertically from the periphery of the bottom wall 5a, and a terminal-receiving portion 53a passing through the bottom wall 5a.

The terminal-receiving portion 53 has an approximately rectangularly-shaped cross section. A plurality of the terminal-receiving portions 53 is arranged in total two rows in parallel with each other along the longitudinal direction of the bottom wall 5a. When an outer-connection member 52b of the connection terminal 52 is press-fitted into the terminal-receiving portion 53, it is closely fitted to the terminal-receiving portion 53 for the prevention of liquid leakage.

A plurality of the connection terminals 42 is respectively made bent by way of, for example, folding a metallic rod. The connection terminal 52 is formed in "L" shape, and also includes a substrate-connection member 52a, and an outer-connection member 52b being perpendicular to the substrate-connection member 52a. The substrate-connection member 52a is inserted into the through-hole 8c in a direction perpendicular to the base 8, passes through the through-hole 8c, and is electrically connected to the base 8 at its tip portion. The outer-connection member 52b is press-fitted into the terminal-receiving portion 53 of the block body 51, passes through the bottom wall 5a, and is electrically connected to a terminal fitting of a wiring harness-side connector at its tip portion.

In the above-referenced connector block 5, the substrate-connection member 52a of the connection terminal 52 is inserted into the through-hole 8c disposed on the base 8, and is secured to the base 8, for example by means of screw, such that the bottom wall 5a is disposed perpendicular to the base 8 and at the same time is in parallel with the longitudinal direction of the base 8. The outer-connection member 52b is formed projecting from the lower end portion 8b of the base 8 and being perpendicular to the width of the base 8, and is inserted into a terminal hole disposed on a lower case 7 that will be hereinafter illustrated in great detail.

The case 3 is shown to include an upper case 6 as shown in FIG. 1, and a lower case 7 as shown in FIGS. 1 and 4. The upper case 6 includes a top wall 6a having the form of an approximately rectangularly-shaped plane, and a peripheral wall 6b extending vertically from the periphery of the top wall 6a, and also has a shape of squamous box.

As shown in FIG. 3, the top wall 6a includes a terminal-receiving portion 61 formed on the inner face of the top wall 6a, a terminal hole 62 passing through the top wall 6a, and a fuse holder 63 formed on the outer face of the top wall 6a.

The terminal-receiving portion 61 is raised from the inner face of the top wall 6a. The terminal hole 62 is formed on the inner face of the terminal-receiving portion 61, and is configured to receive and support the fuse-connection member 42b, which is inserted into the terminal hole 62.

The terminal hole 62 is made to have an approximately rectangularly-shaped cross section. The terminal hole 62 is disposed such that its longitudinal direction is in parallel with that of the top wall 6a. A plurality of the terminal holes 62 are arranged in two rows in parallel with each other along the longitudinal direction of the top wall 6a. At the same time, they are opposed to each other along the width of the top wall 6a. When the upper case 6 is assembled to the printed circuit board assembly 2, the terminal hole 62 is disposed above the bottom wall 4a of the connector block 4. The fuse-connection member 42b passes through the bottom wall 4a and then the terminal hole 62. The terminal hole 62 has a diameter slightly larger than that of the fuse-connection member 42b. In other words, there is a clearance between the terminal hole 62 and the fuse-connection member 42b. Due to this clearance, liquid leakage may occur.

A plurality of the fuse holder 63 each is recessed from the outer face of the top wall 6a. One fuse holder 63 is formed with respect to a pair of the opposing terminal holes 62. One fuse is mounted to one corresponding fuse holder 63. The fuse is electrically connected to the fuse-connection member 42b passing through a pair of the associated terminal hole 62.

Figure 5:
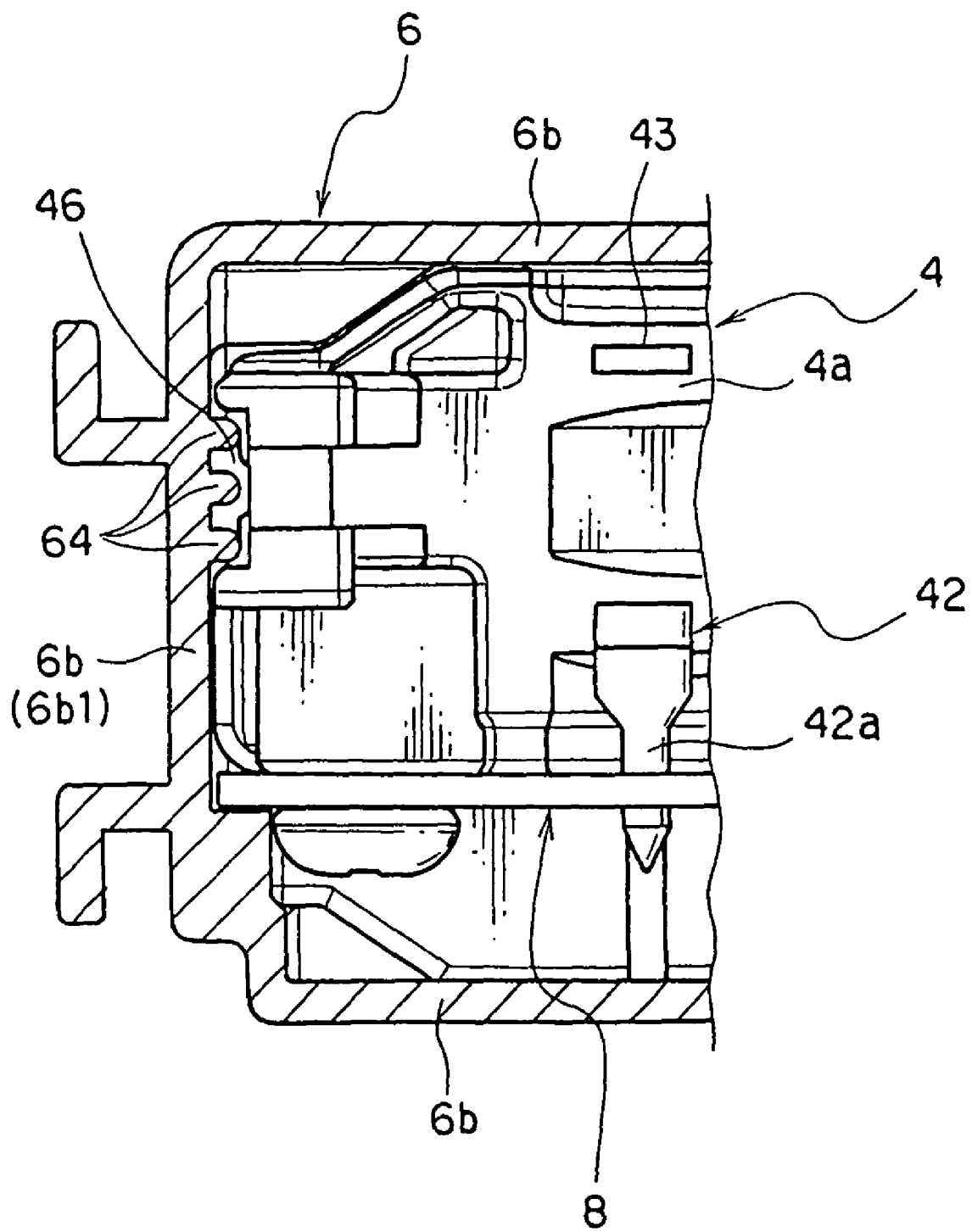
FIG. 5 is a partially cross sectional view taken along line indicated by letter "V" of FIG. 2.

The peripheral wall 6b includes a rib member 64 as shown in FIG. 5, which is configured to receive liquid drained from the outlet 46 formed within the connector block 4. The rib member 64 is formed on one peripheral wall 6b1 communicating with one longitudinal end of the top wall 6a. The rib member 64 is raised from the inner face of the peripheral wall 6b1. The rib member 64 extends perpendicularly to the top wall 6a over the overall longitudinal length of the peripheral wall 6b1 (i.e., reaching the lower end of the upper case 6). A plurality of the rib members 64 are spaced apart from each other and are in parallel with each other at the same time. When the upper case 6 is engaged (or, assembled) to the printed circuit board assembly 2, the rib member 64 is slightly spaced apart from the outlet 46 and is also opposed to the outlet 46. Liquid that is drained from the connector block 4 via the outlet 64 arrives at the rib member 64, flows between the rib members 64, falls down to the lower end of the upper case 6, and is finally drained away from the outside of the case 3.

As shown in FIG. 4, the lower case 7 has a shape of a box, and includes a bottom wall 7a having the form of an approximately rectangularly-shaped plane, and a peripheral wall 7b extending vertically from the periphery of the bottom wall 7a.

The bottom wall 7a includes a terminal hole extending therethrough, and a connector hood 73. The terminal hole is made to have an approximately rectangularly-shaped cross section. A plurality of the terminal holes 62 are arranged in two rows in parallel with each other along the longitudinal direction of the bottom wall 7a. The outer-connection member 52b passes through the bottom wall 5a of the connector block 5 and the terminal hole in turn. The terminal hole has a diameter slightly larger than that of the outer-connection member 52b.

A plurality of the connector hoods 73 is arranged in two rows along the longitudinal direction of the bottom wall 7a. The connector hood 73 is made in a form of hood, and projects towards the lower side of the case 3, as shown in FIG. 4. The outer-connection member 52b of the connection terminal 52 which is inserted into the afore-mentioned terminal hole disposed on the bottom wall 7a is leaded into the connector hood 73. The connector hood 73 is engaged to the wiring harness-side connector, which is not shown but will be located adjacent the bottom side of the case 3. In this case, the connection terminal 52 is electrically connected via the terminal fitting to the connector.

The peripheral wall 7b includes a recessed groove 72 for receiving the lower end of the rib member 64 therein. As shown in FIG. 4, the recessed groove 72 is formed in the peripheral wall 7b1, which is opposed to the peripheral wall 6b1 partly defining the upper case 6 and having the rib member 64 therein. The recessed groove 72 extends perpendicularly to the bottom wall 7a and is also in parallel with rib member 64 disposed in the upper case 6. When the lower case 7 is assembled to the upper case 6, the lower end of the rib member 64 is received within the recessed groove 72, with being spaced apart with the inner face of the recessed groove 72. The liquid falls down form the rib member 64, and is then drained away from the case 3, without flowing into the lower case 7.

When assembled as described below, the afore-mentioned case 3 can receive the printed circuit board assembly 2 therein. Firstly, the outer-connection member 52b of the printed circuit board assembly 2 is inserted into the terminal hole disposed on the lower case 7. Subsequently, the printed circuit board assembly 2 is engaged to the lower case 7 such that the base 8 is disposed perpendicular to the bottom wall 7a of the lower case 7. Thereafter, the upper case 6 is disposed on the upper side of the printed circuit board assembly 2 such that the fuse-connection member 42b can be well inserted into the terminal hole 62 disposed on the upper case 6. Thereafter, the upper case 6 is mounted to the lower case 7 such that the peripheral wall 7b of the lower case 7 and the peripheral wall 6b of the upper case 6 overlap each other.

For assembling the afore-mentioned electric junction box 1, the printed circuit board assembly 2 should be assembled for the first time. In great detail, the method for assembling the printed circuit assembly 2 includes mounting the relay 11 and the resistance 12 on the base 8, securing the block bodies 41 and 51 of the connector blocks 4 and 5 to the base 8 respectively by means of, for example, screw, and mounting the fuse terminal 42 and the connection terminal 52 to the base 8 to prepare the printed circuit board assembly 2. Secondly, the printed circuit board assembly 2 is mounted to the lower case 7, and the upper case 6 is mounted to the resulting lower case 7 to prepare the electric junction box 1. In this electric junction box 1, the fuse is mounted to the fuse holder 63 disposed in the upper case 6, and the wiring harness-side connector is fitted into the connector hood 73 disposed in the lower case 7.

Referring now to the FIGS. 2 to 4, and 6, drainage pathway W of the electric junction box 1 as previously assembled will be hereinafter illustrated in further detail. For example, in the case of performing maintenance operation, there is a case where liquid such as water may be poured into the electric junction box 1 from the upper side thereof. In this case, the upper side can be indicated by an "upper side" in FIGS. 2 to 4, and a "near side" from a viewer in FIG. 6. As shown in FIG. 3, liquid leaks into the fuse holder 63 and then the case 3, due to the clearance between the terminal hole 62 and the fuse-connection member 42b. As a result, the liquid arrives at the bottom face 4d of the connector block 4 along the surface of the fuse-connection member 42b.

The liquid arrives at the bottom face 4d, and flows into the V-shaped groove 45 or the groove 44 that is formed so as to efficiently induce capillary phenomenon. As shown in FIGS. 2, 4 to 6, the liquid is then guided to the outlet 46 along the downwardly inclined bottom face of the groove 44 and the V-shaped groove 45, then arrives at the rib member 64 formed on the peripheral wall 6b1, then falls down from the rib member 64, and is finally drained from the case 3.

In accordance with the electric junction box 1 of this embodiment of the present invention, in a case where liquid leaks into the case 3 and arrives at the bottom face 4d of the connector block 4, the groove 44 is configured to efficiently guide the liquid to the outlet 46 due to its capillary phenomenon. Accordingly, the liquid that is taken up by the groove 44 flows down to outlet 46, and is then drained via the outlet 46. Therefore, the liquid can be prevented from remaining at the bottom face 4d. Owing to this principle, since the liquid can be efficiently drained away from the case 3, and thus any possible adverse effect of liquid remaining within the case 3, for example, short-circuit failure of the fuse terminal 42 and the base 8, can be substantially prevented.

Since the bottom face of the groove 44 is inclined downward toward the outlet 46, the liquid taken up by the groove 44 can be efficiently drained via the outlet 46. In addition, since the liquid can be efficiently drained away from the case 3, and thus any possible adverse effect of liquid remaining within the case 3, for example, short-circuit failure of the fuse terminal 42 and the base 8, can be substantially prevented.

Referring to FIGS. 1 to 7, an electric junction box in accordance with a second embodiment of the present invention will be hereinafter illustrated in further detail. For avoiding overlapped descriptions, the description for the element designated by the same reference numeral in connection with the foregoing electric junction box in accordance with the first embodiment of the present invention will be omitted.

The electric junction box 1 in accordance with the second embodiment of the present invention is shown to include the connector block 4 having a length approximately equivalent to the longitudinal length of the base 8. The block body 41 is shown to have an additional outlet (i.e., a second outlet 46a) communicating with the other end of the groove 44. The bottom face of the groove 44 is inclined downward from the middle area of its longitudinal length toward the both outlets 46 and 46a.

In the electric junction box 1, there is further provided an additional rib member (not shown) designated by a second rib member and projecting from the inner face of the peripheral wall 6b2, which is opposed to the peripheral wall 6b1 of the upper case 6. This second rib member is spaced slightly apart from the second outlet 46a, and at the same time is opposed to the second outlet 46a. The electric junction box 1 further includes an additional recessed groove (now shown) recessed from the outer face of the other peripheral wall that is opposed to the peripheral wall 7b1 of the lower case 7. The additional recessed groove can be also designated as a second recessed groove, and is configured to receive the lower end of the second rib member while being spaced apart from the inner face of the second recessed groove. In this case, since the second outlet 46a, the second rib member, and the second recessed groove each have the same construction as the foregoing outlet 46, the rib member 64, and the recessed groove 72 respectively, the detailed descriptions regarding the foregoing elements will be omitted for avoiding unnecessary overlapping.

Referring now to FIG. 7, there will be provided two drainage pathways W1 and W2 in the electric junction box 1 in accordance with this embodiment of the present invention. The drainage pathways W1 and W2 are respectively indicated by dotted lines. If liquid leaks into the case 3 and arrives at the bottom face 4d of the connector block 4, liquid flowing into the groove 44 can be efficiently guided to the outlet 46 through the downwardly inclined bottom face of the groove 44. The liquid is finally drained away from the case 3 via the rib member 64. This drainage pathway can be indicated by W1 in FIG. 7. Simultaneously, the liquid can be guided to the other outlet (i.e., the second outlet 46a), and then finally drained away from the case 3 via the second rib member. This drainage pathway can be indicated by W2 in FIG. 7.

Since the electric junction box 1 in accordance with this embodiment of the present invention includes the second outlet 46a communicating with the other end of the groove 46 in the block body 41, and the bottom face of the groove 44 downwardly inclined from the middle area of the longitudinal length thereof toward the respective outlets 46 and 46a, it is possible to shorten the length of the groove 44 inclined toward a single direction, and therefore to expedite liquid drainage via such a groove 44.

While a preferred embodiment of the invention has been shown and described with particularity, it will be appreciated that various changes and modifications may suggest themselves to one having ordinary skill in the art upon being apprised of the present invention. It is also intended to encompass all such changes and modifications as fall within the scope and spirit of the appended claims.

The invention claimed is:

1. An electric junction box, comprising:
   a wiring board;
   a connector block having a body, and a terminal passing through a bottom wall of the body and being electrically connected to the wiring board at an end portion thereof, the body having a narrow groove formed on an inner face of the bottom wall, and an outlet communicating with an end of the groove, the groove having a width small enough to provide a capillary phenomenon; and
   a case being disposed above the bottom wall, having a hole disposed thereon, and being configured to receive both the wiring board and the connector block therein, the hole being configured to pass an opposite end portion of the terminal therethrough, and
   wherein, when liquid leaks into the case via the hole and arrives at the bottom wall, the groove is configured to take up the liquid and the liquid droplet that is liable to stagnate on the bottom wall, and to actively guide the liquid and the liquid droplet to the outlet due to the capillary phenomenon.

2. The electric junction box according to claim 1, wherein the body further includes an additional outlet communicating with an opposite end of the groove, and the bottom face of the groove is formed to be inclined downward from a middle area of longitudinal length of the groove toward each of the outlets.

3. The electric junction box according to claim 1, wherein the groove has a bottom face inclined downward toward the outlet.

4. The electric junction box according to claim 3, wherein the body further includes an additional outlet communicating with an opposite end of the groove, and the bottom face of the groove is formed to be inclined downward from a middle area of longitudinal length of the groove toward each of the outlets.

* * * * *